(No Model.) 2 Sheets—Sheet 1.

W. ROBINSON.
CAR SPRING CHECK.

No. 444,182. Patented Jan. 6, 1891.

Witnesses:
John Burley
Edw. E. Whiting

Inventor:
William Robinson (No Model.) W. ROBINSON. CAR SPRING CHECK.

2 Sheets—Sheet 2.

No. 444,182. Patented Jan. 6, 1891.

Witnesses:
John Burley
Edw. E. Whiting

Inventor:
William Robinson

UNITED STATES PATENT OFFICE.

WILLIAM ROBINSON, OF BOSTON, MASSACHUSETTS, ASSIGNOR TO THE ROBINSON RADIAL CAR TRUCK COMPANY, OF PORTLAND, MAINE.

CAR-SPRING CHECK.

SPECIFICATION forming part of Letters Patent No. 444,182, dated January 6, 1891.

Application filed April 7, 1886. Serial No. 198,052. (No model.)

*To all whom it may concern:*

Be it known that I, WILLIAM ROBINSON, a citizen of the United States, residing in Boston, in the county of Suffolk and State of Massachusetts, have invented a new and useful Car-Spring Check or Air-Cushion, of which the following is a specification.

When cars or carriages pass over rough places, the sudden and considerable compression and rebound of the springs make very rough riding, even when the best springs are used. To obviate this and afford a gentle check or cushion to the action of the spring, thus overcoming all violent vibration and making riding easier, is the object of my invention. To this end I utilize the movement which causes the sudden vibration of the spring to compress air or other fluid within a cylinder, whereby the vibration of the spring is gradually retarded and limited and the shock dissipated on a cushion of compressed air or other fluid.

In all the figures in the accompanying drawings, which form a part of this specification, my invention is shown in vertical section, and similar letters indicate corresponding parts.

Figure 1:
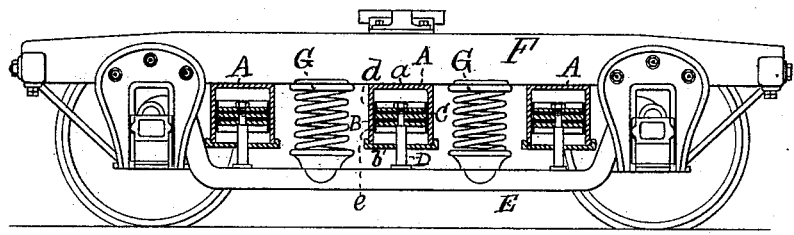
Figure 2:
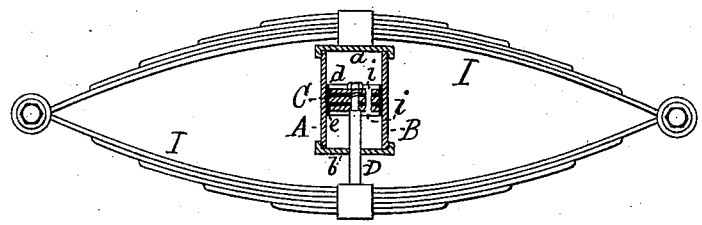
Figures 3, 4, 5:
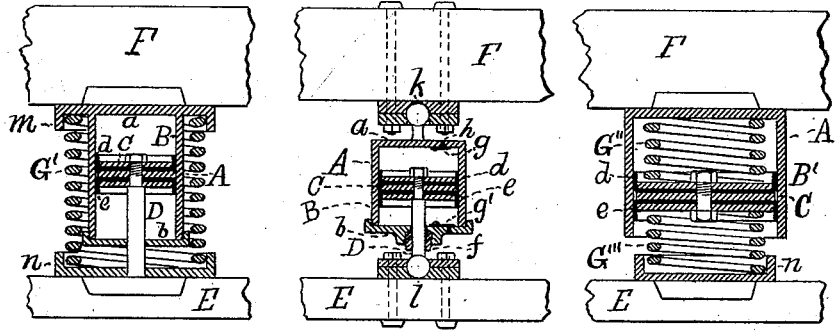
Figure 6:
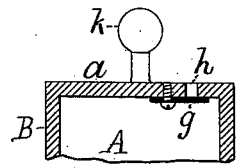
Figure 7:
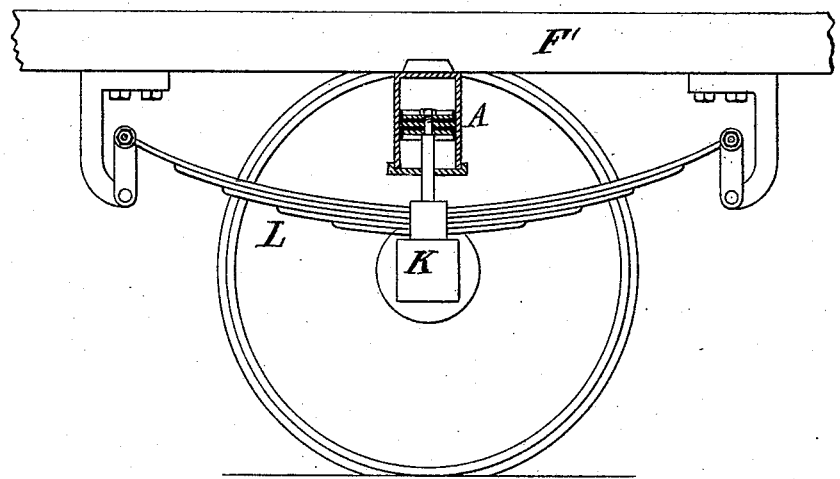
Figure 8:
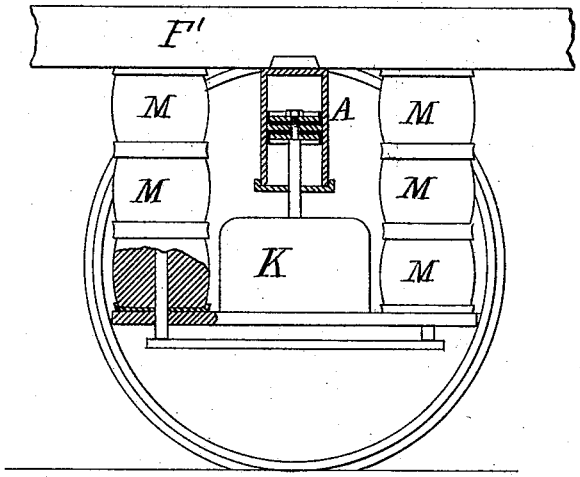
Figure 9:
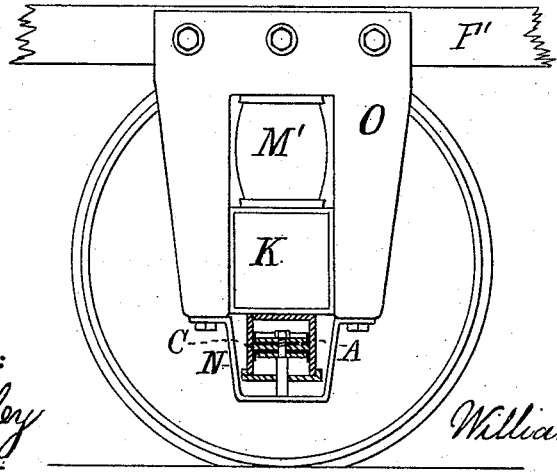

Figure 1 shows my car-spring check applied to a car-truck. Fig. 2 shows it in connection with an elliptic spring. Fig. 3 shows it inclosed in a spiral spring, and Fig. 4 shows it in detail. Fig. 5 is a modification, and Fig. 6 is an enlarged view, of a section of the cylinder, showing a valve. Fig. 7 shows the car-spring check as applied in connection with a semi-elliptic spring, as in a street-car. Figs. 7 and 8 show it as applied between the axle-box and car or truck frame, while Fig. 9 shows it applied below the axle-box.

A is a car-spring check consisting, essentially, of a cylinder B, provided with a piston C, attached to the piston-rod D. Said cylinder has its ends inclosed with tight-fitting caps or covers $a$ and $b$, the piston-rod D extending out of said cylinder through the cap $b$. The piston C is packed, preferably, with cup-shaped packings $d$ $e$, opening in opposite directions, whereby said piston fits the cylinder tightly in whichever direction said piston may move relatively to said cylinder.

Referring to Figs. 1, 3, and 4, the cylinder B has its upper end attached to the truck-frame F and the piston-rod D attached to the equalizer E. Thus when the springs G or G', Figs. 1 and 3, are compressed the air in the cylinder above the piston is compressed and forms a cushion to retard any violent compression of the spring, while at the same time the air below the piston is rarefied, thus further retarding the movement of the piston and consequently of the spring. When the spring rebounds or opens, the reverse action takes place. The air below the piston is compressed and that above it is rarefied, whereby the rebound of the spring is retarded and cushioned. Thus it will be seen that by the use of this air-cushion or check all violent shocks and vibrations of the springs are averted and the riding made much easier and more comfortable. When heavy loads are to be supported, I use air-tight cylinders, as described, and to make the lower chamber of the cylinder air-tight I use the stuffing-box $f$, Fig. 4, through which the piston-rod D passes. For light loads, in some cases I provide the cylinder with valves $g$ $g'$, placed inside and at opposite ends of the cylinder and covering the orifices $h$. (See Figs. 4 and 6.) By this arrangement the valve is closed and the air compressed in front of the piston, but allowed to fill the chamber behind the same, under ordinary atmospheric pressure, by opening the valve inwardly. These valves are adjustable and should not be made altogether tight, otherwise the piston would not readily return to its normal position. In some cases I place the valves $g$ $g'$ over the orifices $h$ outside of the cylinder instead of inside, thus allowing the air to escape slowly in front of the piston while retarding the same. At the same time the valve in its rear being closed, the air in the rear of the piston becomes rarefied, and thus also retards the advance of the piston. When a heavier fluid than air is used, or when to exclude dust or for other cause it is desirable to prevent any connection between the interior of the cylinder and the outer air and yet to regulate the pressure in said cylinder, I make a small orifice in the piston C at $i$, Fig. 2, whereby the air or other fluid may pass slowly from one side of said piston to the other. The rapidity of this passage may be regulated in any suitable manner.

In Fig. 3 the spring-check A is shown inclosed within a spiral spring G', the cylinder being suitably attached to the upper spring-seat m, and the piston-rod to the lower spring-seat n, while in Fig. 2 the check is attached to and between the upper and lower members of the elliptic spring I. When conditions permit I prefer these arrangements, since the check is wholly or partly concealed, takes up no more room than the spring, and the springs can be furnished already provided with checks adapted to the capacity of the springs. Nevertheless the check can be readily applied to trucks already in use without interfering with their mechanism, as shown in Fig. 1, A. I apply to each side of the truck one, two, or three checks, according to requirements.

In Figs. 7 and 8 the car-spring check is shown as connecting the axle-box K with the truck or car frame F'. In Fig. 7 it is shown in connection with the semi-elliptic spring L, and in Fig. 8 between the side springs M. This arrangement is particularly adapted to street-cars when there is room for the check between the axle-box K and the car-frame F'. In some cases, however, there is not room. I then apply the check below the box K, as shown in Fig. 9. Here one end of the check A is connected to the bottom of the axle-box K and the other end to the strap or guard N, attached to the pedestal O, the latter being bolted to the car-frame F', whereby the up-and-down movement of the pedestal O compresses the air alternately above and below the piston C and retards the action of the spring M', substantially as already described.

It frequently happens that there is an irregular side movement between the adjustable parts of the truck or car. Particularly is this the case in a street-car. To compensate for such irregularity of movement, I provide the check with flexible, preferably ball-and-socket, joints k l at opposite ends. (See Figs. 4 and 6.) As this joint may be of any suitable construction it is not necessary to more fully describe it here.

In Fig. 5 a modification is shown in which a spring G'' is inclosed in the cylinder B'. The piston C is supported by the lower spring G''', and the inclosed spring G'' is provided with an air check or cushion, while the spring G''' operates in the open air in the usual manner.

In a carriage or hack the check A may be attached directly to the axle and to the body of the carriage.

I do not limit myself to the specific construction of the check herein described, consisting, essentially, of a cylinder and piston; but in some cases I may use a diaphragm or bellows construction of the check, and instead of compressing the air within the check mechanism may produce a partial vacuum therein and actuate the check by means of the direct pressure of the external atmosphere.

In all cases any other fluid may be substituted for air in my car-spring check, if it be found to answer the purpose as well or better, without interfering with the spirit of my invention.

I claim as my invention, and desire to secure by Letters Patent—

1. In combination with a car-spring, a cylinder provided with a piston working therein, said cylinder and piston being adapted to retard and limit the vibration of said spring, substantially as described.

2. The combination, with a car or truck frame provided with a spring or springs, of a cylinder having a piston working therein, said cylinder and piston opening and closing in unison with said springs and adapted to retard and limit the vibrations thereof through the agency of fluid-pressure, substantially as set forth.

3. The combination, substantially as herein set forth, of a spring and a check mechanism consisting, essentially, of a cylinder and a piston working therein, said check mechanism being wholly or partly inclosed by said spring and adapted to retard the vibrations thereof by means of fluid-pressure.

4. In combination with a car-spring, check mechanism consisting, essentially, of the cylinder B, the piston C, working therein and provided with cup-shaped packings d e, opening in opposite directions, for the purpose of securing a close fit while said piston is moving in either direction with reference to said cylinder, substantially as described.

5. In combination with the truck-frame F, the equalizer E, and the springs G, one or more check mechanisms consisting, essentially, of cylinders and pistons working therein, said check mechanisms being connected between said truck-frame and equalizer and adapted to retard and limit the vibrations of said springs by means of fluid-pressure, substantially as described.

6. A car-spring check mechanism constructed substantially as described, and provided at each end with a flexible or universal joint adapting said check mechanism to readily adjust itself to any irregular motion of the movable parts of the car or truck, substantially as set forth.

7. The combination, with a car-spring, of check mechanism consisting, essentially, of the cylinder B and piston C, working therein, said piston being provided with an opening or passage-way, whereby air or other fluid may pass alternately from one end of said cylinder to the other through said opening or passage-way, substantially as described.

WILLIAM ROBINSON.

Witnesses:
FRANCIS S. DYER,
GEO. T. ANGELL.